INVENTOR.
Franz W. R. Starp
BY
Arthur A. March
ATTORNEY

June 21, 1966 F. W. R. STARP 3,256,796
PHOTOGRAPHIC SHUTTER WITH IMPROVED PAWL ARRANGEMENT
Filed June 30, 1964 3 Sheets-Sheet 2

INVENTOR.
Franz W. R. Starp
BY
Arthur A. March
ATTORNEY

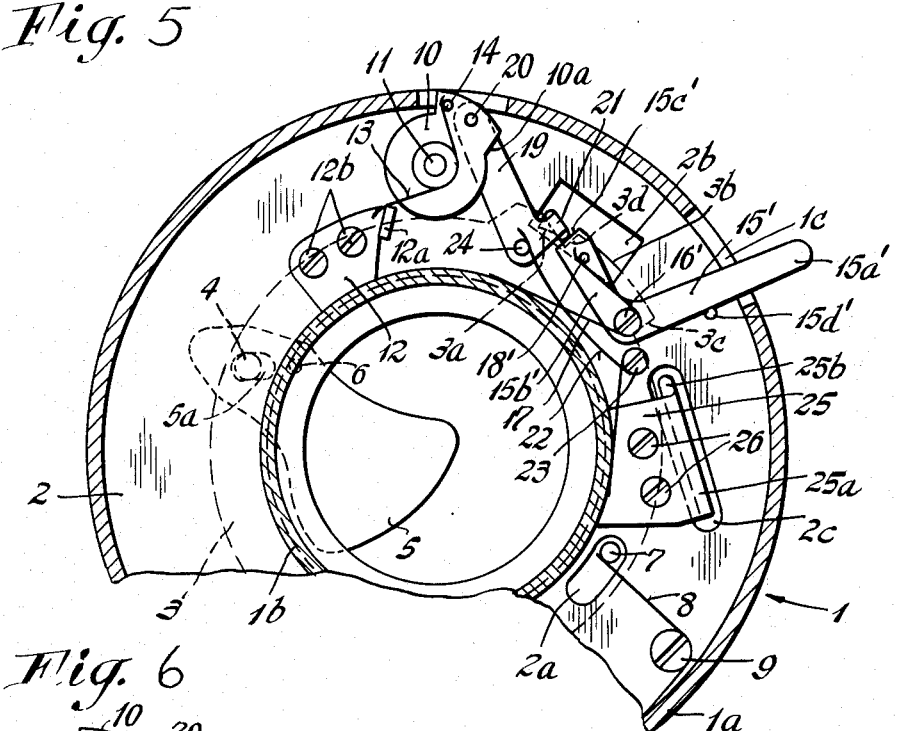
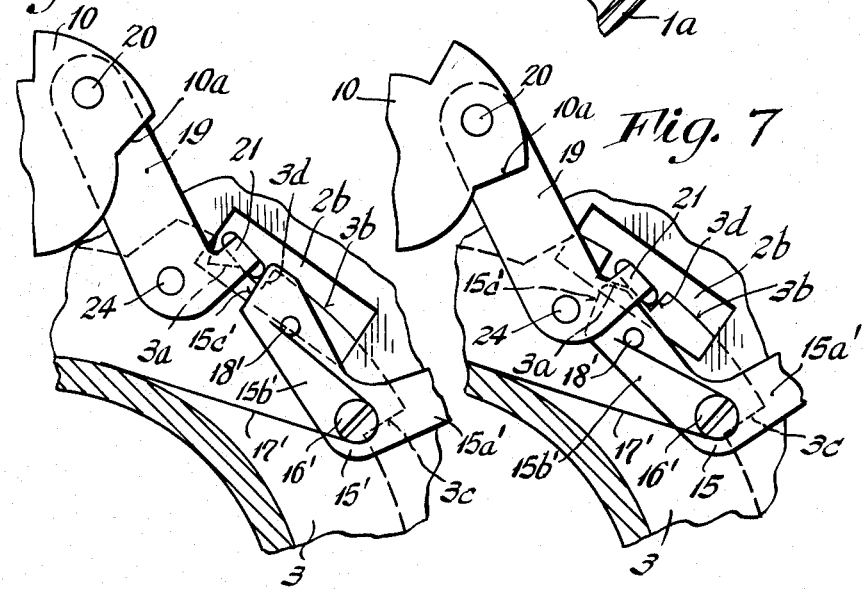

PHOTOGRAPHIC SHUTTER WITH IMPROVED PAWL ARRANGEMENT

Franz W. R. Starp, Calmbach (Enz), Germany, assignor to Alfred Gauthier, G.m.b.H., Calmbach (Enz), Germany, a corporation of Germany
Filed June 30, 1964, Ser. No. 379,331
Claims priority, application Germany, July 3, 1963, G 38,086; July 19, 1963, G 38,227
6 Claims. (Cl. 95—63)

This invention relates to a photographic shutter of the type in which a spring-driven member is connected to means to operate shutter blades by way of a driving pawl articulately connected to driving means.

In pawl-operated shutters of the type known heretofore, the shutter blade driving member, which is usually in the form of a ring, is provided with a driving pin that extends parallel to the optical axis and has a semicircular cross section. The driving pawl for use with such semicircular driving pins is articulately connected to a spring-driven driving member and has a notch with parallel edges to engage the pin. Although such shutters have been generally satisfactory, some improvement has been needed.

For example, it has frequently been found that a small moment of rotation was imparted to the pawl during the driving operation owing to friction in the articulate connection between the driving member and the pawl, and this moment of rotation causes the pawl to lift out of contact with the pin. This tendency can be overcome by a sufficiently strong spring forcing the pawl into connection with the pin, but only at the cost of higher frictional resistance, especially during the cocking process when the pawl slides along the plane surface of the pin. Because of the high frictional force, there is a risk that the shutter blade driving ring will be moved by the pawl while the shutter is being cocked and will thus be unintentionally opened, which, of course, would expose the film. In order to obviate this risk, a retaining spring has been added heretofore to hold the shutter blade driving ring in its closed position, but when it is desired to make an exposure, the pressure of the latter spring must be overcome by the main driving spring. The strengthening of this driving spring further increases the cocking force required and makes it more difficult to achieve extremely short exposure times or extremely high shutter speeds.

It is one of the objects of the present invention to produce a shutter operating structure having an improved pawl and shutter blade driving ring mechanism which will overcome the foregoing difficulties.

The present invention includes a driving pawl with a free end and shaped so as to be elongated in a direction tangential to the circumference of the shutter blade driving ring and rounded at the edges. This elongated rounded portion extends parallel to the optical axis of the shutter and substantially at a right angle to the plane in which the main part of the pawl moves. This rounded portion is held in engagement with a suitably shaped opening or notch in the shutter blade driving ring by means of a spring pressing upon the pawl. However, due to the configuration of the rounded portion and the notch, this spring need not assert a very great force. The rounded portion is kept engaged with the recess in the shutter blade driving ring during the running down motion of the shutter, i.e., during the time that the shutter is being opened to admit light to the film, because of the interfitting shape of the rounded portion and the abutting portion of the shutter blade driving ring. As a result, there are no forces that tend to remove the rounded portion from engagement with the notch in the shutter blade driving ring, which reduces the force required of the spring that presses these two elements together, and there is a minimum drag of the rounded portion upon the shutter blade driving ring during cocking, so that there is little likelihood that the shutter will be inadvertently opened during the cocking process. Because of this, the cocking moment of the driving member during the opening and closing of the shutter blades is available in its entirety. Still another advantage arises from the fact that the driving member can be given a substantially greater pull during the cocking process than was possible with structures known heretofore and this is especially desirable in those cameras in which the cocking lever is used both for cocking the shutter and for transporting the film.

A particularly simple and desirable form of the invention is that in which the rounded portion is in the form of a lug bent from the main body of the pawl at the free end thereof.

In order to lock the shutter drive system in the cocked position the spring driven driving member may be locked directly by the shutter release trigger, but in such an arrangement it is necessary that the shutter release positively engage the driving member before the cocking lever or knob is released; otherwise the driving member would immediately be rotated by the spring so as to force the driving pawl to actuate the shutter as soon as the cocking knob or lever is released.

The present invention provides further a simple means for assuring that the driving member and pawl cannot carry out such untimely and concontrolled operation by providing a shutter release trigger in the form of a lever which engages the pawl itself and preferably in a direction substantially in line with the thrust of the pawl. By means of this arrangement, which requires no extra parts, and therefore no extra cost, the locking of the shutter blade drive system in the cocked position always takes place at the same time as the engagement of the driving pawl with the shutter blade driving ring. This has the advantage that faulty exposures due to unintentional opening of the shutter blades upon release of the locking device are avoided.

One form of this shutter release trigger which has been found to be especially advantageous is an arresting lever which has an arm that extends approximately parallel to the operating direction of the driving pawl and terminates in a free end which meets the forward, rounded portion of the pawl approximately at a right angle when the pawl is in its cocked position. The dependability of operation of this device may be further increased by arranging the free end of the lever so that the rounded portion of the driving pawl is pressed into the opening, or recess, in the shutter blade driving ring under the influence of the main driving spring that supplies power for the driving member.

The invention will be described in greater detail in the following specification in which:

FIG. 5 shows a different embodiment of a shutter mechanism in the cocked position;

FIG. 6 is an enlarged view of a portion of the blocking mechanism for the shutter of FIG. 5; and FIG. 7 shows the mechanism of FIG. 6 at the start of the operation of the shutter when an exposure is being made.

Figure 1:
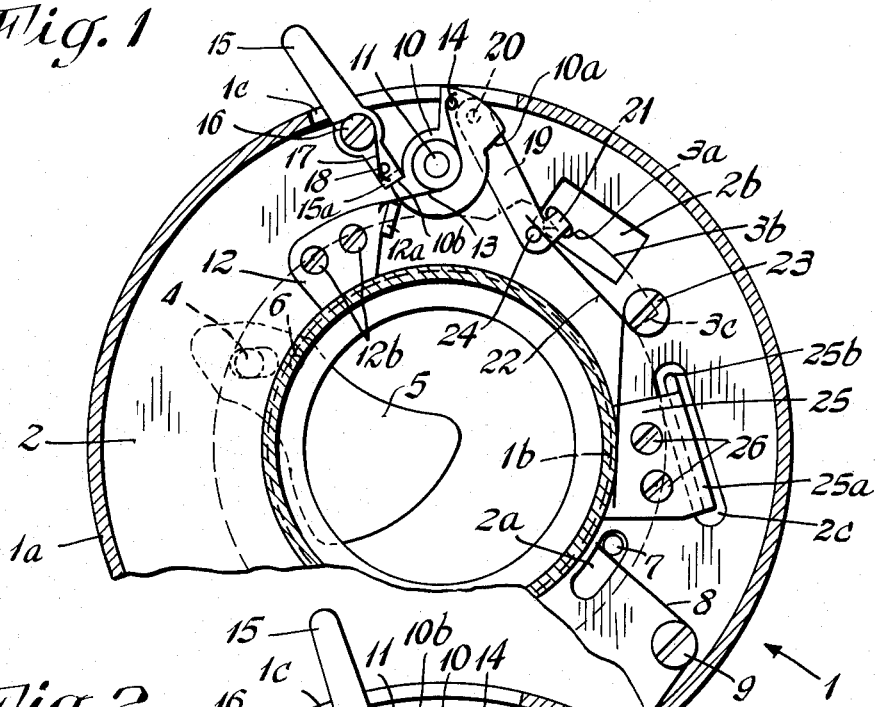
FIG. 1 shows the interior of an intra-lens shutter and particularly the driving mechanism for opening and closing the shutter blades, the driving mechanism and the shutter blades being in the cocked position.
Figure 2:
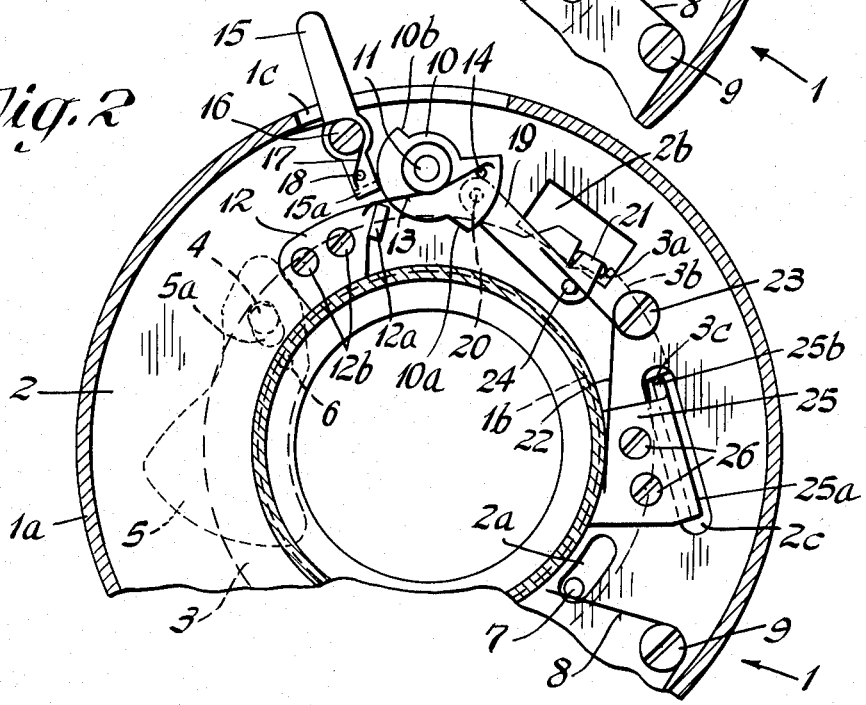
FIG. 2 shows the mechanism of FIG. 1 during the operation of the shutter and specifically at the moment of reversal of motion of the shutter blade driving ring, with the shutter blades in their open position.

FIG. 1 shows a shutter housing 1 having a base plate 2 with an outer wall 1a and an inner wall 1b, both of which are shown in cross-sectional form. A shutter blade driving member, in the form of a ring 3, is rotatably mounted behind the plate 2 and is provided with a plurality of pins 4, only one of which is shown, to serve as means to operate a corresponding plurality of shutter blades 5 by engagement with a slot 5a in each of the shutter blades. Each of the blades is pivotally mounted on a pin 6 affixed to the housing so as to be able to swing between the closed position shown in FIG. 1, which is the most counterclockwise position, and an open position when the blades are rotated clockwise.

The angle of rotation of the ring 3 is limited by a stop pin 7 which projects into a slot 2a is in the plate 2. One end of a spring 8, which is wound about a screw 9 attached to the housing, engages the pin 7 and the other end engages the outer wall 1a to urge the ring 3 counterclockwise, thereby urging the shutter blades 5 into the closed position.

A driving member 10 in the form of a disk is rigidly attached to a cocking shaft 11 which is rotatably mounted in the housing 1 and in the plate 2. The extent of clockwise rotary motion of the disk 10 is limited by the engagement of a stop edge 10a on the disk with a lug 12a on a spring stop 12. These two stops strike together at the end of the running down motion of the driving disk. The stop 12 is attached to the plate 2 by two screws 12b. A driving spring 13, which causes the member 10 to rotate clockwise, engages the stop 12 and, specifically, the lug 12a thereof. The other end of the spring 13 is hooked over a pin 14 on the driving member 10. The shutter driving mechanism is controlled by a shutter release trigger in the form of a lever 15 having a lug 15a at one end and engaging an edge 10b of the driving member 10 to prevent the latter from rotating out of its cocked position until the shutter release is actuated. The shutter release 15 pivots about a screw 16 affixed to the plate 2, and one end of a spring 17 coiled about this screw hooks over a pin 18 while the other end of the spring engages the outer wall 1a to urge the shutter release in the counterclockwise direction, which is the direction to hold it in the path of the edge 10b. Both the shutter release 15 and the driving member 10 project into an opening 1c in the outer wall 1a of the housing.

Figure 4:
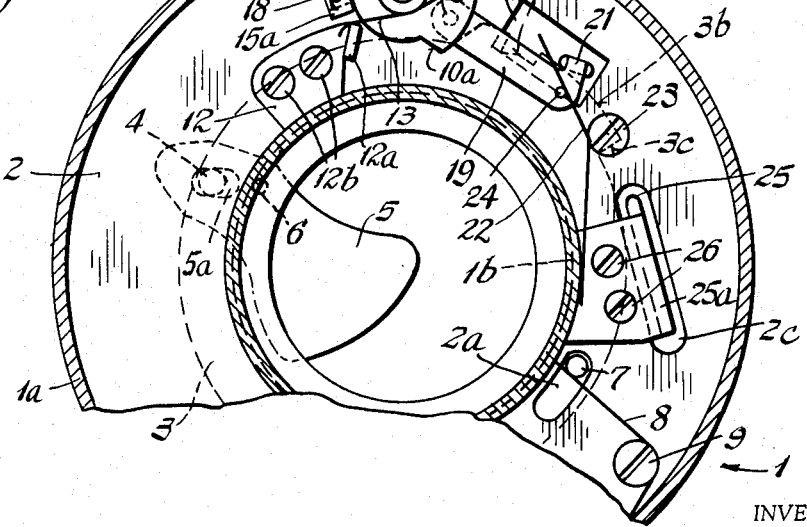
FIG. 4 shows the mechanism of FIGS. 1 through 3 during the cocking of the shutter.

One end of a driving pawl 19 is pivotally connected to the driving member 10 by a pin 20, while the other end of the pawl is bent at an angle and is provided with a rounded, shaped portion 21 that extends parallel to the shutter axis, or optical axis, and extends through a window 2b in the plate 2 to engage a notch 3a in the periphery of the ring 3. The shaped portion 21 is elongated and has two rounded edges and during the deviating motion shown particularly in FIG. 4 the shaped portion 21 slides over a circumferential section 3b of the ring 3 as may be seen through the window 2b in FIG. 1. A weak spring 22 is wound about a screw 23 affixed to the plate 2 and engages both the inner wall 1b and a pin 24 on the pawl 19 to bias the latter clockwise and thus to keep it in engagement with the ring 3. In order to intercept the inertial forces of the ring 3, and of the shutter blades 5, operated thereby, when the blades reach the open position and their motion is to be reversed, a reflex stop 25 is provided and is attached to the plate 2 by screws 26. One section 25a of the stop 25 is bent so as to project through an elongated slot 2c in the plate 2.

FIG. 5 shows another embodiment in which the shutter release trigger 15' has a somewhat different form. One end 15a' extends through the slot 1c in the outer wall 1a of the housing and is used by the photographer to actuate the shutter. The other end 15b' of the shutter release 15' is bent at an angle and engages the rounded portion 21 to receive the pressure of the driving pawl 19 and to hold the same, and thereby the driving member 10, in cocked position until the shutter release 15' is rotated counterclockwise.

Figure 3:
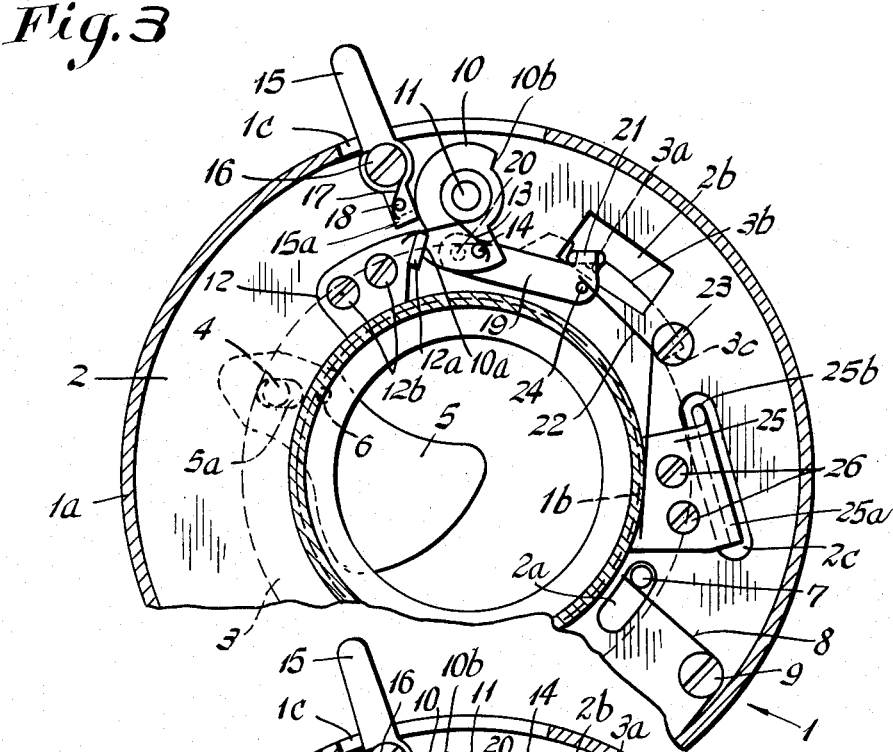
FIG. 3 shows the mechanism of FIGS. 1 and 2 at the end of an exposure with the shutter blades again returned to the closed positions.

The operation of the embodiment shown in FIGS. 1 through 4 is as follows:

At the beginning of the operation it will be assumed that the shutter blades 5 are closed and that the shutter is in condition to make an exposure as shown in FIG. 1. Upon movement of the shutter release 15 clockwise, the lug 15 releases the driving member 10 so that the driving member can rotate clockwise and push the pawl 19 to the right into the position indicated in FIG. 2. In so doing, the righthand end of the shaped portion 21, which rests in the slot 3a, pushes the ring 3 clockwise so as to swing the shutter blades 5 to the open position as indicated in dotted lines in FIG. 2. At the instance of maximum clockwise travel of the blades 5 and the ring 3, the stop edge 3c strikes the edge 25b and rebounds resiliently therefrom to assist in moving the shutter blades back to their closed positions. Meanwhile the continued clockwise rotation of the driving member 10 causes the pawl 19 to move to the left so that the lefthand end of the shaped portion 21 engages the adjacent surface of the notch 3a and pulls on the shutter ring 3 until the stop edge 10a strikes the fixed lug 12a as shown in FIG. 3. At this instance the shutter is closed so that no further light can reach the film.

When the shutter is subsequently cocked to make a new exposure, the driving member 10 is rotated counterclockwise by the cocking shaft 11. The rounded righthand edge of the shaped portion 21 slides up over the adjacent edge of the notch 3a, which may also be rounded, so that the ring 3 is not rotated while the driving member 10 is being cocked and in spite of the fact that the pawl 19 goes through a reciprocating motion, first moving out to the extent indicated in FIG. 4 and subsequently, as counterclockwise rotation of the driving member 10 is continued, back into the position indicated in FIG. 1. At this time the shaped portion 21 again falls into the notch 3a under the weak pressure of the spring 22. At the same time the shutter release 15 will, under the force of the spring 17, click into place against the stop edge 10b to hold the driving member 10 cocked.

FIG. 5 shows another embodiment of the invention with an improved shutter release. Those parts of FIG. 5 that are identical with corresponding parts in the embodiments of FIGS. 1–4 have been labeled with the same reference numerals. As in the previously described embodiment, the shutter housing 1 has an outer wall 1a, an inner wall 1b, and a base plate 2. The shutter blade driving means, which is rotatably mounted between the base plate 2 and the bottom of the housing 1 has a number of pins 4 that engages the slots 5a in the shutter blades 5, only one of which is shown. These blades are pivotally mounted on pins 6 rigidly attached to the housing.

When the ring 3 rotates clockwise relative to the position shown in FIG. 5, the blades 5 swing out to permit light to pass along the optical axis, which is perpendicular to the plane of the drawing. The maximum outward swing of the blades is limited by the stop pin 7, which extends into the slot 2a in the base plate 2. This pin is subjected to the force of a retaining spring 8 that tends to keep the shutter blades 5 closed.

The disc-shaped driving member 10 is mounted on a cocking shaft 11 that extends through the base plate 2. Clockwise rotary motion of the driving member 10 is limited by the stop edge 10a, which, at the end of an exposure, strikes a lug 12a bent off from spring stop 12. The latter is attached by means of two screws 12b to the base plate 2. The driving spring 13 which provides the driving force for the member 10 has one end hooked over the lug 12a and the other end hooked over the pin 14 on the driving member 10.

The driving member has a pin 20 on which the pawl 19 is pivotally mounted so as to move articulately with respect to the driving member. The free end of the pawl has a rounded, elongated portion 21 which extends in the direction of the optical axis through the window 2b in the base plate 2 and engages the recess 3a in the shutter blade driving ring 3. The rounded, elongated portion 21 is shaped so that it fits properly in the recess 3 during clockwise rotation of the driving member 10 in making an exposure and so that it slides easily over the surface of the circumferential section 3b of the shutter blade driving ring 3 during cocking of the shutter. The rounded portion 21 is lightly resiliently biased against the ring 3 by the spring 22, one end of which bears against the wall 1b and the other end of which is hooked over a pin 24 on the driving pawl 19. This spring is held in position by being wound around the screw 23.

The mechanism of FIG. 5 is locked in the cocked position by a two-armed arresting lever 15' pivotally mounted on a fixed bearing pin 16'. One arm 15a' of this lever extends through a slot 1c in the outer wall 1a to serve as a shutter release trigger. The shutter may be operated to take a picture by moving the shutter release 15a' counterclockwise. The other arm 15b' of the lever 15' extends toward the end of the rounded portion 21 and substantially directly in line to receive the thrust of the pawl 19. This latter arm terminates in an edge 15c', which may be referred to as a bolting edge, against which the rounded portion 21 presses when the shutter is cocked.

The shape of the edge 15c' and its position are such that the force of the spring 13 pressing the pawl 19 against the edge 15c' produces a radial resultant force that urges the rounded portion 21 into the recess 3a due to the shape of the rounded portion. A coil spring 17' wound about the bearing pin 16' exerts a clockwise force upon the lever 15' by virtue of the fact that one end of this spring is hooked over a pin 18' while the other end presses against the inner wall 1b of the shutter housing. This keeps the lever 15' normally in contact with a fixed pin 15d'. The lever 15' is so located with respect to the recess 3a in the ring 3 that the edge 15c' is between the forward edge 3d of the recess 3a and the forward edge of the rounded portion 21 when the shutter is cocked.

The inertial forces of the ring 3 and the blades 5 are utilized to bounce the ring and blades back toward the closed position by having the stop edge 3c of the ring strike the edge 25b of a bent-off portion 25a of a reflex stop 25 attached by means of two screws 26 to the base plate 2. The bent-off portion 25a extends through an elongated slot 2c in the base plate 2.

The operation of the shutter of FIG. 5 will be described with reference also to FIGS. 6 and 7, in which FIG. 6 is merely an enlargement of one part of FIG. 5.

If, when the shutter is cocked, as it is in FIGS. 5 and 6, the shutter release lever 15' is actuated by moving the arm 15a' counterclockwise, the supporting edge 15c' will also pivot counterclockwise, as shown in FIG. 7, releasing the rounded portion 21 and freeing the pawl 19 to permit the spring 13 to rotate the driving member 10 and begin the reciprocating motion of the pawl. This drives the ring first clockwise, as the rounded portion 21 presses against the forward edge 3d of the recess 3a, and then counterclockwise, as the rear edge of the rounded portion 21 pulls against the rear edge of the recess during the latter part of the motion of the driving member 10. The reversal of direction of the ring 3 is helped by the edge 25b of the reflex stop, which receives, and immediately returns the impact of the edge 3c of the ring. The return pull of the rounded portion 21 ends when the stop edge 10a of the driving member 10 strikes the fixed lug 12a.

During the subsequent cocking process, the driving member 10 is rotated counterclockwise, back into the position shown in FIG. 5, by means of a shaft 11 connected to a cocking device (not shown), which may also be coupled to a film transport device. During cocking, the rounded portion 21 first slides out of the recess 3a and then along the circumferential section 3b, until the pawl 19 completes another reciprocating cycle. At the end of this cycle, the rounded portion clicks into the recess 3a beyond the edge 15c'. If the shaft 11 is released thereafter, the shutter will remain locked until the next time the shutter release is actuated.

What is claimed is:

1. A photographic shutter having an optical axis and comprising: a driving member; a driving spring connected to said member to actuate the same; shutter blades; means connected to said blade for moving said blade; a driving pawl, one end of said pawl being articulately connected to said driving member so that said pawl moves in a plane perpendicular to said optical axis; a rounded portion on the other end of said pawl extending substantially parallel to said axis and substantially perpendicular to the direction of motion of said other end of said pawl, said means having a notch therein fitting said rounded portion; and a spring pressing said pawl into said notch.

2. A photographic shutter having an optical axis and comprising: a driving member; a driving spring connected to said member to operate the same; shutter blades; a shutter blade driving ring connected to said blades; a driving pawl, one end of said pawl being articulately connected to said driving member to be moved thereby in a plane perpendicular to said optical axis; a rounded portion extending from the other end of said pawl and connected thereto, said rounded portion extending in the direction of said optical axis and substantially tangentially with respect to the circumference of said shutter blade driving ring, said ring having a notch in said circumference to fit against said rounded portion and a spring urging said rounded portion against said shutter blade driving ring.

3. A photographic shutter according to claim 2 in which the rounded portion of said pawl is a lug extending from said other end of said pawl and bent substantially at a right angle to said pawl.

4. A photographic shutter having an optical axis and comprising a driving member; a driving spring connected to said member to operate the same; a pawl, one end of said pawl being articulately connected to said driving member; a rounded portion at the other end of said pawl extending substantially parallel to said optical axis; shutter blades; a driving ring for said shutter blades, said ring having a notch therein, said rounded portion fitting into said notch and extending substantially parallel to the circumference of said driving ring; a lever pivotally mounted and having one end engaging said rounded portion when said shutter is cocked; a first spring engaging said lever to urge it away from in front of said rounded portion; and a second spring bearing on said pawl to hold it in contact with said driving ring.

5. A photographic shutter according to claim 4 in which one end of said lever comprises an arm extending substantially parallel to the direction of motion of said other end of said pawl, said one end of said lever having an edge approximately at a right angle to the rounded portion of said pawl when said pawl is in the cocked position of said shutter.

6. A photographic shutter according to claim 5 in which said edge of said one end of said lever is shaped to press said rounded portion of said pawl into said notch in said shutter blade driving ring under the pressure of said driving spring acting on said driving member.

References Cited by the Examiner
UNITED STATES PATENTS 2,953,075  9/1960  Barth _____ 95—63

JOHN M. HORAN, *Primary Examiner.*